(12) United States Patent
Büchler et al.

(10) Patent No.: US 10,421,149 B2
(45) Date of Patent: Sep. 24, 2019

(54) PRESSURE WELDING DEVICE AND PRESSURE WELDING METHOD

(71) Applicant: KUKA INDUSTRIES GMBH, Augsburg (DE)

(72) Inventors: Michael Büchler, Augsburg (DE); Otmar Fischer, Augsburg (DE); Harald Meyer, Augsburg (DE); Klaus Schneider, Friedberg (DE)

(73) Assignee: KUKA INDUSTRIES GMBH, Augsburg (DE)

( * ) Notice: Subject to any disclaimer, the term of this patent is extended or adjusted under 35 U.S.C. 154(b) by 113 days.

(21) Appl. No.: 15/526,122

(22) PCT Filed: Nov. 12, 2015

(86) PCT No.: PCT/EP2015/076422
§ 371 (c)(1),
(2) Date: May 11, 2017

(87) PCT Pub. No.: WO2016/075228
PCT Pub. Date: May 19, 2016

(65) Prior Publication Data
US 2017/0304931 A1    Oct. 26, 2017

(30) Foreign Application Priority Data
Nov. 12, 2014    (DE) .................... 20 2014 105 434 U

(51) Int. Cl.
*B23K 20/12* (2006.01)
*B23K 9/08* (2006.01)
*B21D 22/02* (2006.01)

(52) U.S. Cl.
CPC .............. *B23K 20/12* (2013.01); *B21D 22/02* (2013.01); *B23K 9/08* (2013.01); *B23K 20/126* (2013.01)

(58) Field of Classification Search
None
See application file for complete search history.

(56) References Cited

U.S. PATENT DOCUMENTS

| 3,627,189 A | 12/1971 | Ditto et al. |
| 3,740,827 A | 6/1973 | Hunter et al. |

(Continued)

FOREIGN PATENT DOCUMENTS

| DE | 19 58 833 A1 | 6/1970 |
| DE | 197 45 123 C1 | 6/1999 |

(Continued)

*Primary Examiner* — Devang R Patel
(74) *Attorney, Agent, or Firm* — McGlew and Tuttle, P.C.

(57) ABSTRACT

A pressure welding method and a pressure welding device are provided. The pressure welding device includes a plastification device (7), an upsetting device (8) and component mountings (34,35,36,37), for the components (2,3,3',4) to be welded together, and a machine frame (12). The pressure welding device (1) further includes a machine head (13,14) with a component mounting (34, 35) and an associated additional component mounting (36, 37) and the machine head (13) is moveably arranged on the machine frame (12). The pressure welding device includes a machining device (18), for the welding part (5,5'), which is associated with the machine head (13,14) or the additional component mountings (36, 37). An adjusting device (17) generates a relative movement between the machine head (13,14) and the associated additional component mounting (36,37) for machining the welding part (5,5').

17 Claims, 11 Drawing Sheets

(56) References Cited

U.S. PATENT DOCUMENTS

| | | | | | |
|---|---|---|---|---|---|
| 3,853,258 | A | * | 12/1974 | Louw | B23K 20/12 156/73.5 |
| 4,733,814 | A | * | 3/1988 | Penman | B23K 20/12 228/114.5 |
| 4,757,932 | A | * | 7/1988 | Benn | B23K 20/121 228/102 |
| 5,795,419 | A | * | 8/1998 | Lotz | B23K 20/121 156/350 |
| 6,021,938 | A | * | 2/2000 | Bock | B23K 20/12 228/102 |
| 6,068,038 | A | * | 5/2000 | Kawaura | B23K 20/12 156/267 |
| 8,578,992 | B2 | * | 11/2013 | Kawaura | B23K 20/12 156/358 |
| 8,960,524 | B2 | * | 2/2015 | Okuno | B23K 20/26 228/112.1 |
| 9,802,269 | B2 | * | 10/2017 | Rudolph | B23K 20/121 |
| 2003/0197047 | A1 | * | 10/2003 | Kanzaki | B23K 20/12 228/2.1 |
| 2007/0181639 | A1 | * | 8/2007 | Rudolph | B23K 20/121 228/101 |
| 2009/0242613 | A1 | * | 10/2009 | Kawaura | B23K 13/015 228/114.5 |
| 2010/0206861 | A1 | * | 8/2010 | Rudolph | B23K 20/121 219/137 R |

FOREIGN PATENT DOCUMENTS

| | | |
|---|---|---|
| DE | 20 2004 010386 U1 | 12/2005 |
| DE | 20 2012 103219 U1 | 1/2014 |
| JP | H03 268884 A | 11/1991 |
| JP | 2011 025281 A | 2/2011 |
| WO | 86/05134 A1 | 9/1986 |

\* cited by examiner

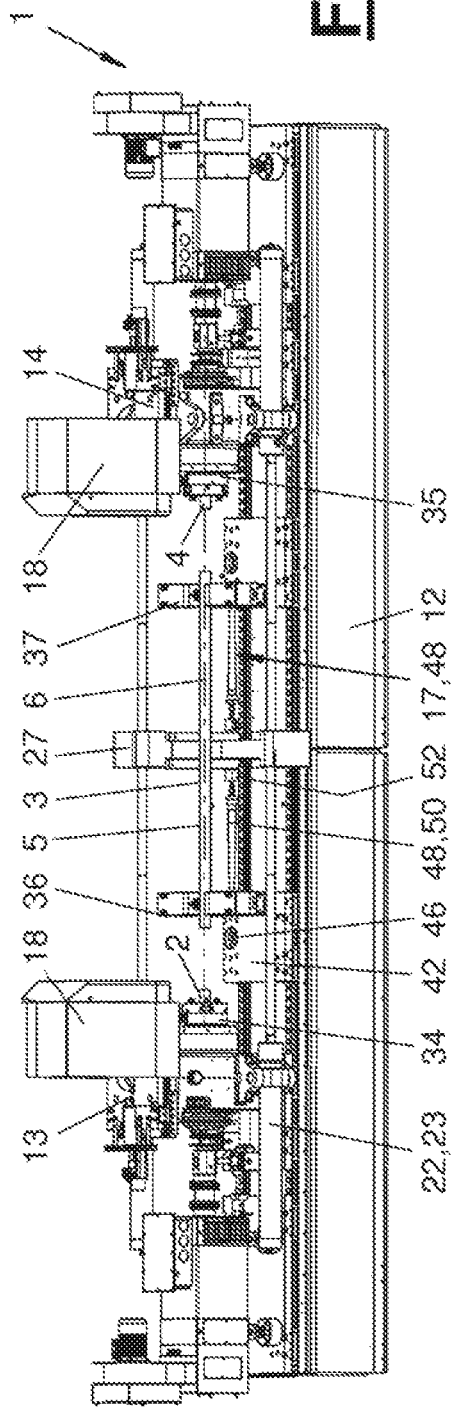
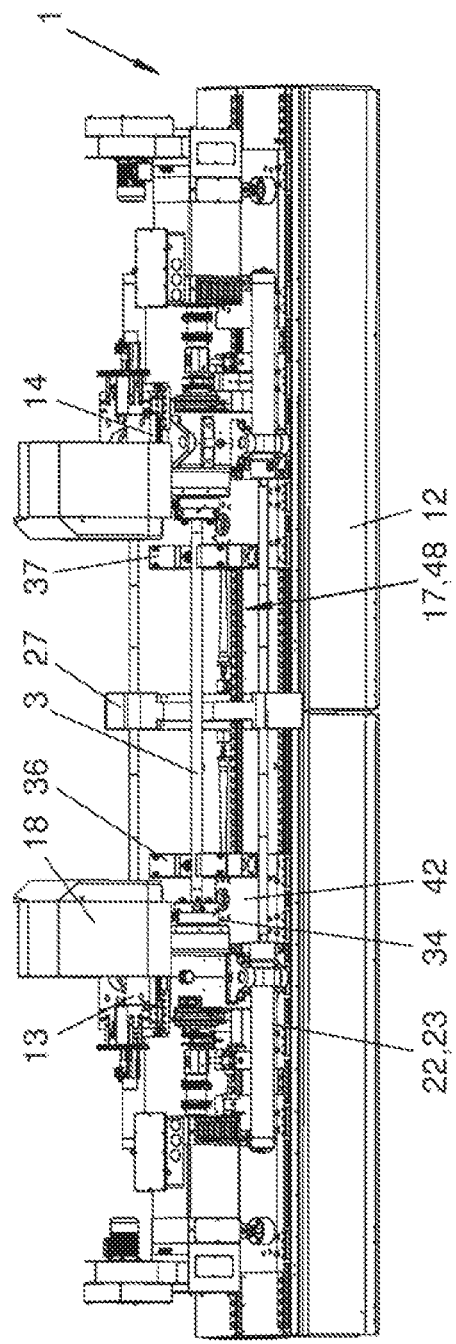

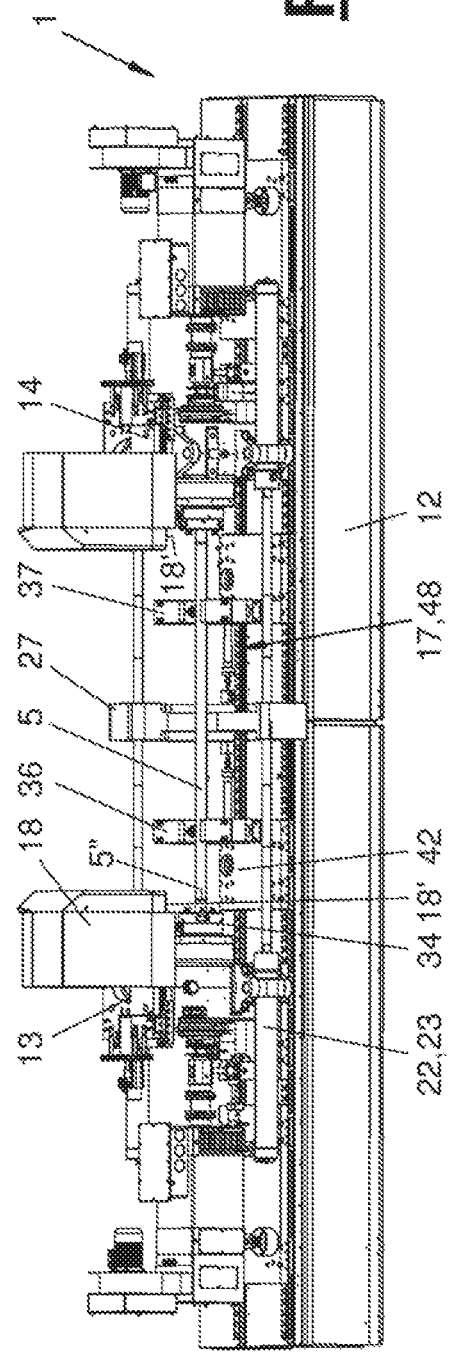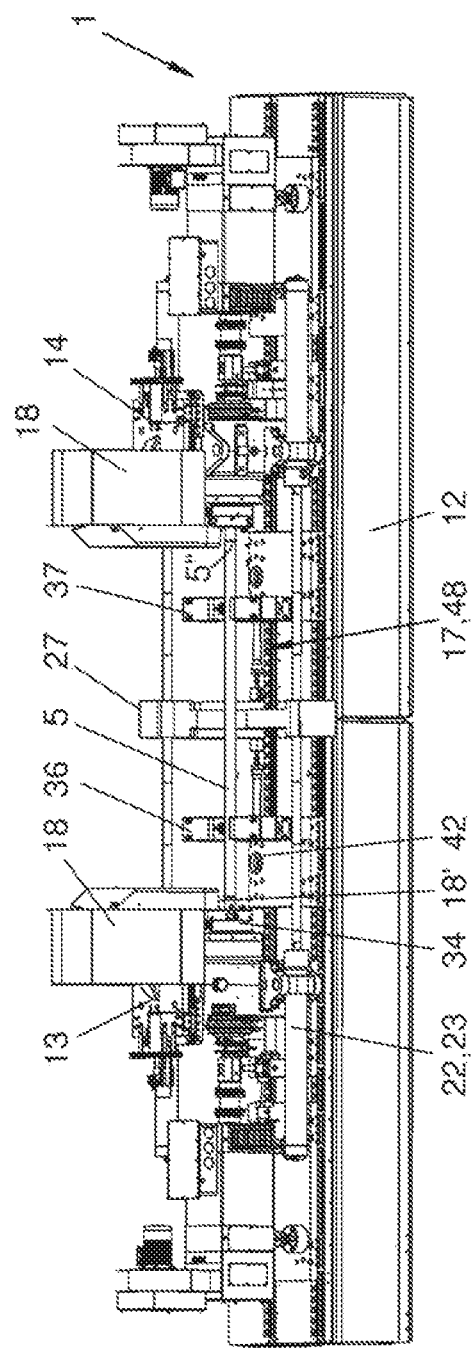

PRESSURE WELDING DEVICE AND PRESSURE WELDING METHOD

CROSS REFERENCE TO RELATED APPLICATIONS

This application is a U.S. National Phase Application of International Application PCT/EP2015/076422, filed Nov. 12, 2015, and claims the benefit of priority under 35 U.S.C. § 119 of German Application 20 2014 105 434.0, filed Nov. 12, 2014, the entire contents of which are incorporated herein by reference.

FIELD OF THE INVENTION

The present invention pertains to a pressure welding device with a plasticization device and with an upsetting device as well as with component mounts for the components to be welded together and with a machine frame, wherein the pressure welding device has a machine head with a component mount and to a pressure welding method.

BACKGROUND OF THE INVENTION

Such a pressure welding device is known from practice. It may be configured as a friction welding device or as a welding device with an arc moved rotatingly magnetically and has, in both variants, a plasticization device and an upsetting device each as well as component mounts for the components to be welded together. It further has a machine frame, on which a machine head with a component mount is arranged movably. An associated additional component mount is likewise arranged movably on the machine frame. Single-head machines and double-head machines are known from practice, and two machine heads and one or two additional or central component mounts are present in the latter case. A possibly necessary finishing of the welded part is carried out separately and at another location in the case of the prior-art pressure welding devices.

SUMMARY OF THE INVENTION

An object The object of the present invention is to show an improved pressure welding technique.

The pressure welding technique according to the invention, i.e., the pressure welding device and the pressure welding method, have various advantages. On the one hand, they make it possible to increase the performance capacity and the quality of the process in pressure welding. On the other hand, the degree of automation and hence also the economy can be improved. Set-up times and downtimes can be extensively avoided or at least reduced. In addition, ergonomics is improved.

The machining device according to the invention makes possible the finishing of the welded part in the mounted or clamped position at the pressure welding device. Machining is carried out, for example, on the weld joint or weld joints, and the ring-shaped weld bead present there is removed. This is efficient and saves time, additional effort and costs.

The weld joint is often located in the immediate vicinity of the machine head and of the component mount located there, which may lead to space problems. The adjusting device according to the invention makes it possible to form a distance between the machine head and the associated additional component mounts, as a result of which sufficient space is created for the machining and for good accessibility to the machining point, especially to the weld joint.

The independently driven motion of the additional or central component mount, which is controllable by means of the adjusting device, makes, in addition, possible completely different machining techniques. A machining device located at this component mount can be fed and positioned by means of this motion to the weld joint or it may also perform a working stroke in the machining process.

In addition, machining is, in principle, possible and intended at any desired machining point on the welded part and not only at the weld joint. The machining process may also have any desired configuration. A cutting process, especially turn-off or punching process and a corresponding device and tool configuration are preferred.

The adjusting device according to the invention makes possible, in addition, a simple and rapid adaptation of the pressure welding device to different component dimensions, especially component lengths. In addition, insertion or component tolerances as well as elastic shortening of the component that may possibly occur during the welding process can be compensated. This can take place automatically.

Optimization of the pressure welding process and optimal contacting of the components to be welded together and of the upsetting head are also achieved with the adjusting device. This is also advantageous for the optimization of the process sequences, especially a programmed control of the plasticization and upsetting phases as well as of the feeds and shortening of the components that occur in the process, Welded parts with very high quality can be manufactured as a result. This pertains, on the one hand, to the quality of the welded connection and, on the other hand, to the constant length of the welded parts.

Further, the upsetting device with an upsetting drive, which is arranged between the machine head and the upsetting head and acts by pulling, is modified within the framework of an independent invention idea. This drive has two or more parallel drive units, e.g., cylinders, which are arranged along and on both sides next to the machine axis. The cylinder housings are preferably supported at the preferably stationary machine head, and the retractable piston rods are permanently connected at their free ends to the upsetting head. The upsetting forces are transmitted as a result in a favorable manner in terms of kinking as pulling forces and are no longer transmitted as forces of pressure as in the state of the art.

According to the invention, a pressure welding device is provided with a plasticization device and with an upsetting device as well as with component mounts for components to be welded together and with a machine frame. The pressure welding device has a machine head with a component mount and an associated additional component mount, and the machine head is arranged movably on the machine frame.

According to the present invention, the pressure welding device has a plasticization device and an upsetting device as well as a mounting for the components to be welded together and a machine frame as well as a machine head and an upsetting or support head, which are movable relative to one another along a machine axis on the machine frame, wherein the upsetting device has an upsetting drive with two or more parallel drive units, which are arranged along and on both sides next to the machine axis, said upsetting drive being arranged between the machine head and the upsetting or support head and acting by pulling.

The embodiment and arrangement of the upsetting drive makes, in addition, possible a flow of forces in a closed circuit and between the machine head and the upsetting head, which ensures improved support of forces and avoids undesired deformations and relieves the load on the machine frame. Due to the different vertical positions of the cylinders, especially of the piston rods thereof, the ergonomics and the accessibility at the operating area or on the operating side of the pressure welding device can be improved. In addition, the floatingly mounted component mount can additionally be guided at the piston rods via plain bearings.

Further advantageous additions may be made for the pressure welding device by means of additional components.

This pertains, e.g., to an actuating device arranged in the drive train between the spindle drive and the spindle for a clamping device at the component mount of the machine stock or headstock. The drive torque can now be transmitted via the drive housing of an actuating drive in an extensively deformation-free manner. Very high torques can thus also be transmitted with a clamping device actuation. On the other hand, a direct drive, in which the drive motor can be aligned with its motor axis essentially flush with the spindle axis, is possible hereby. Due to the separation of the actuating device from the drive motor, the latter may have any desired configuration. This makes possible the use of cost-effective standard motors. In addition, a direct drive is especially favorable for movable machine heads.

The direct drive eliminates the need for the intermediate gear with a belt drive, which gear has hitherto been common in many cases. The introduction of transverse forces onto the drive train can be avoided. The susceptibility to wear is markedly reduced.

In addition, additional components, e.g., a multiple disk brake and a rotary coupling for compensating alignment errors, may be accommodated in the drive train. In addition, a mass decoupling device may be implemented between the spindle drive and a machine head fed axially in the process.

It is further possible to combine the drive motor with a disk flywheel, which can be seated behind the drive motor when viewed from the machine head. The spindle drive may, in addition, be arranged on the machine frame, as desired, stationarily or floatingly or displaceably in the direction of the machine axis. A substantially wider bandwidth and freedom of configuration is obtained for the spindle drive due to the actuating device according to the invention. This makes it, in addition, possible to adapt to different requirements imposed on the machine, the operation or the process.

The pressure welding device may have various configurations. It may be configured, e.g., as a friction welding device. The components are preferably aligned here along the machine axis and plasticized on their front edges facing each other by friction and connected to one another by subsequent axial upsetting. As an alternative, pressure welding is possible with a circumferentially moved arc. The rotation of the arc can be controlled here by a drive device. Such a pressure welding device may likewise have a rotatable component mount at the machine head.

The present invention is schematically shown in the drawings as examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a side view showing the pressure welding device from FIG. 1 in one of different operating positions;

FIG. 7 is a side view showing the pressure welding device from FIG. 1 in another of different operating positions;

FIG. 8 is a side view showing the pressure welding device from FIG. 1 in another of different operating positions;

FIG. 9 is a side view showing the pressure welding device from FIG. 1 in another of different operating positions;

DESCRIPTION OF THE PREFERRED EMBODIMENTS

Figure 1:
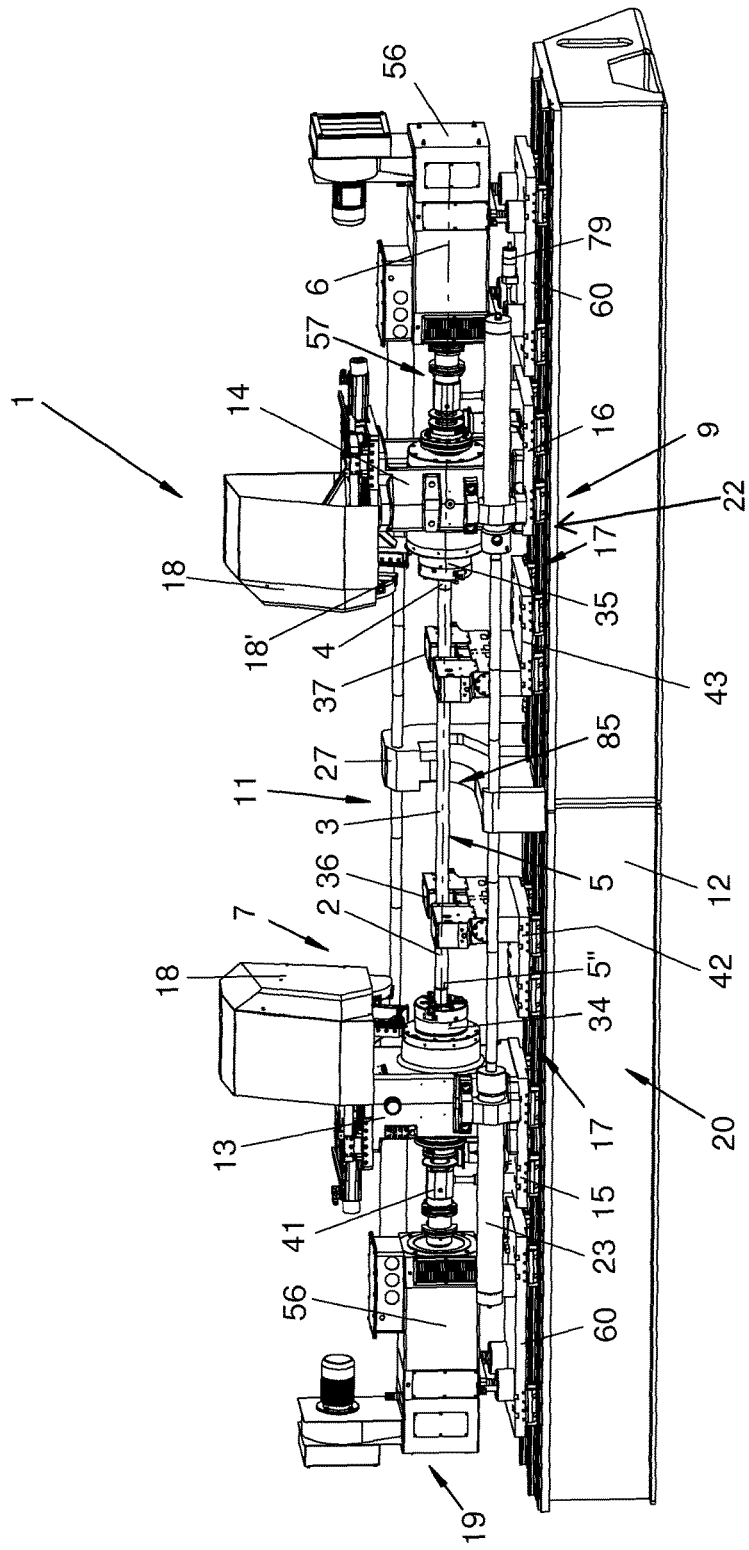
FIG. 1 is a perspective side view showing a pressure welding device.
Figure 2:
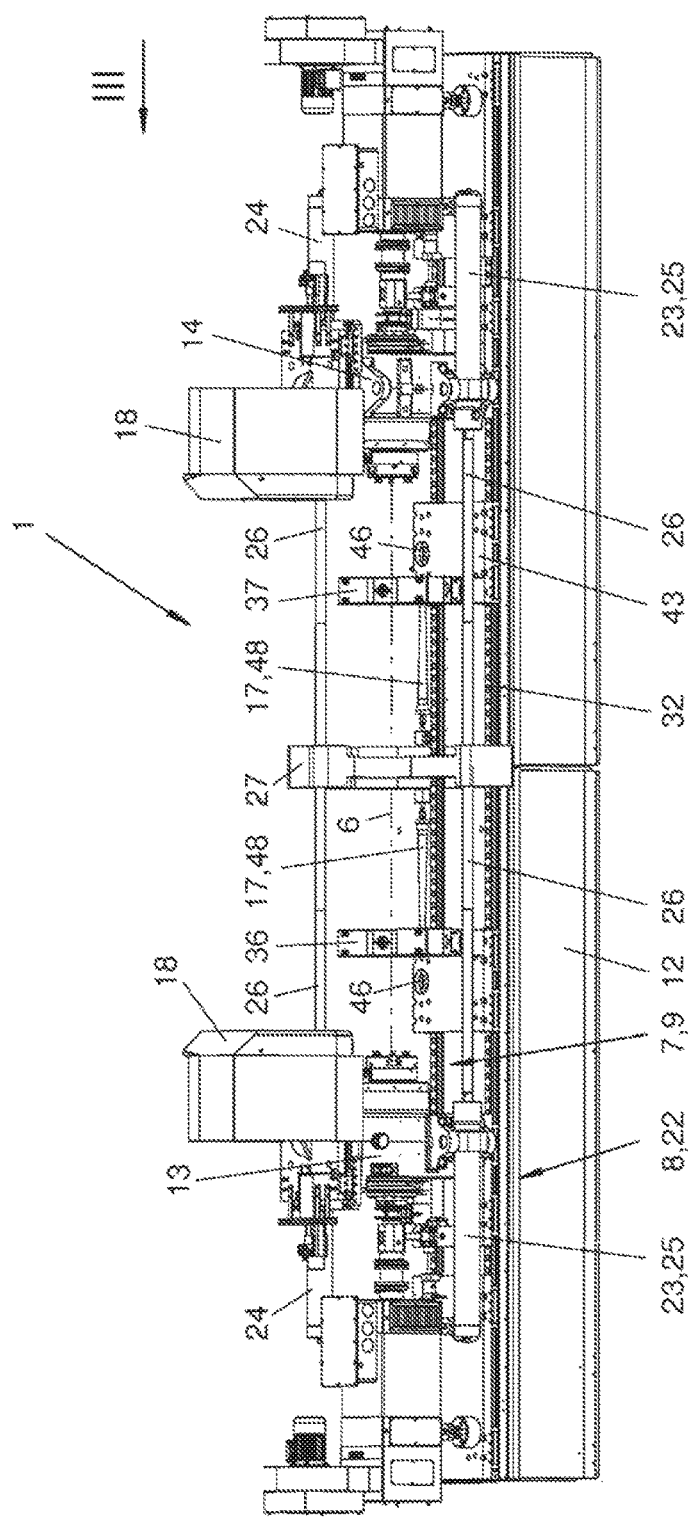
FIG. 2 is a side view showing the pressure welding device from FIG. 1.
Figure 3:
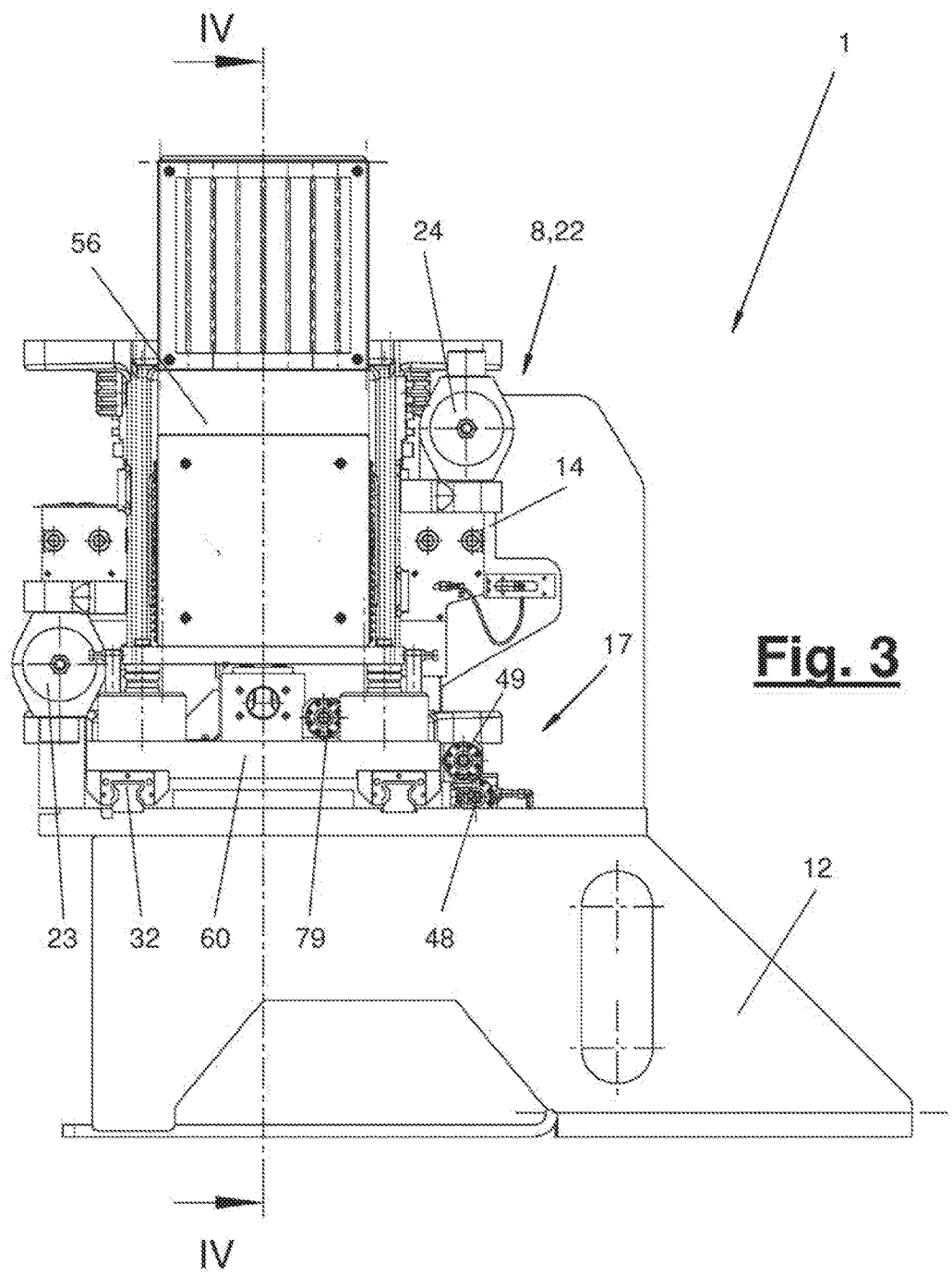
FIG. 3 is a front view of the pressure welding device from FIGS. 1 and 2.

Referring to the drawings, the present invention pertains to a pressure welding device (1) and to a pressure welding method.

The pressure welding device (1) and the pressure welding method may have various configurations. A plasticization device (7) and an upsetting device (8), with which the components (2, 3, 3', 4) to be welded together are melted or softened on the sides or edges facing each other and are upset while forming a welded part (5, 5'), are common to the different variants. The upsetting device (8) has for this an upsetting drive (22), which moves the components (2, 3, 3', 4) relative to one another.

The pressure welding device (1) further has a machine and process control (not shown), which is connected to the machine components described below and controls these. The machine and process control is, in addition, connected to the sensing, detection or measuring devices mentioned below and processes the signals thereof. It may have a memory-programmable configuration and contain one or more process or sequence programs, a technology data bank, memories for programs and recorded process data, a quality monitoring along with logging or the like.

The plasticization device (7) and the plasticization method may have various configurations. In the embodiments shown in FIGS. 1 and 10, the pressure welding device (1) is configured as a friction welding device, wherein the plasticization device (7) has a friction device (9).

In one variant, not shown, the plasticization device (7) may have an arc device, which heats and partially melts the edges of the components with an arc, the arc being moved along the circumference of the components with magnetic force by means of a drive device.

In the different variants, the pressure welding device (1) has a machine frame (12) with a longitudinal or machine axis (6) and a mounting (11) with component mounts (34, 35, 36, 37) for the components (2, 3, 3', 4) to be welded together. The machine frame (12) has a floor-mounted machine bed, on which the components of the pressure welding device (1), which will be explained below, are arranged. Further, an operating material supply unit (19) is present. It makes available the operating materials needed, especially electric current, hydraulic fluid, compressed air, lubricant and coolant or the like and routes these to the respective consumers.

The pressure welding device (1) has an enclosing protective housing with a closable access on the operating side (20). Here, a worker or a robot can feed the components (2, 3, 3', 4) to be joined and remove the finished welded part (5, 5').

The pressure welding of the components (2, 3, 3', 4) takes place in the direction of the machine axis (6), along which the components (2, 3, 3', 4) are also aligned. The components (2, 3, 3', 4) are now plasticized on the front sides or edges facing each other, especially by rotary friction or by the rotation of the arc, and upset along the machine axis (6).

The components (2, 3, 3', 4) may consist of various materials. Metallic materials, especially steel, light metal alloys, cast alloys or the like are preferably used. The material pairings may be different. Especially iron-containing materials may be joined with nonferrous metals. In addition, non-metallic materials, e.g., ceramic materials, may be welded, especially in conjunction with another metallic component.

FIGS. 1 through 5 show a first variant of the pressure welding device (1) in the form of a double-head machine, in which two outer components (2, 4) are preferably welded simultaneously to the ends of a central component (3). A three-part welded part (5) is formed as a result.

Figure 10:
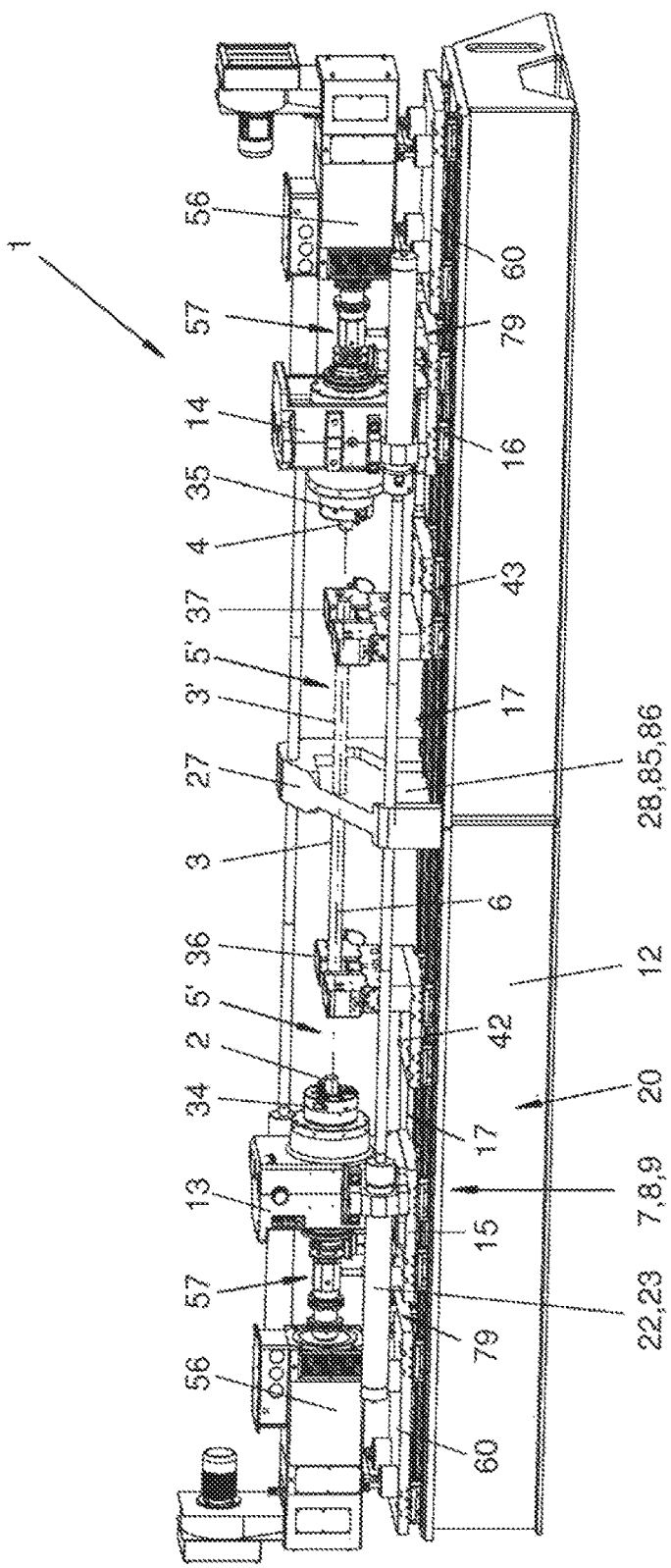
FIG. 10 is a perspective side view showing a variant of the pressure welding device from FIG. 1.

FIG. 10 shows a second variant, which is configured as a double single-head machine, in which end-side components (2, 4) are welded each to a component (3, 3'), wherein two welded parts (5'), which are two-part welded parts, are formed. These two welding processes may take place independently from one another. Further, a configuration of the pressure welding device (1), not shown, as a simple single-head machine, is possible, which represents, e.g., a variant, especially a halving, of FIG. 10.

In the different variants, the pressure welding device (1) has at least one machine head (13, 14) with a component mount (34, 35), which machine head is arranged movably on the machine frame (12). Two machine heads (13, 14) are arranged movably located on the machine frame (12) opposite each other on the machine axis (6) in the variants according to FIGS. 1 and 10 of the double-head machine or double single-head machine. Only one movable machine head (13) is provided in the above-mentioned single-head machine. The number of machine heads may also be greater than two in other variants. The multiple machine heads (13, 14) are preferably of an identical configuration, but they may, as an alternative, also be different.

The machine head or machine heads (13, 14) is/are always mounted axially displaceably in relation to the machine frame (12), especially to the machine bed thereof. They are arranged for this, e.g., on a carrier (15, 16), which is guided displaceably and supported on the machine bed by means of a guide (32) aligned along the machine axis (6).

The machine head (13, 14) is always moved by the upsetting head (22). In the exemplary embodiments shown in FIGS. 1 and 10, an upsetting drive (22) of its own is associated with each machine head (13, 14). This drive may be supported on an upsetting head or support head (27) arranged centrally and stationarily on the machine frame (12). Such a stationary upsetting or support head (27) may also be present in a single-head machine. An upsetting drive (22) common for both machine heads (13, 14) may also be used in a variant of the pressure welding device (1), e.g., a double-head machine. The upsetting drive (22) develops pulling forces in the preferred embodiment, which will be explained in more detail below.

The mounting (11) for the components (2, 3, 3', 4) has, in addition to the component mount (34, 35) at the respective machine head (13, 14), an additional component mount (36, 37), which is arranged movably between the head (13, 14) and the upsetting or support head (27) on the machine frame (12). The component mount (36, 37) is preferably mounted displaceably along the machine axis (6). The respective component mount (36, 37) may have for this, e.g., a carrier (42, 43), especially a slide, which is likewise mounted longitudinally displaceably on the guide (32). This so-called additional or central component mount (36, 37) has a controllable clamping device (39) with plurality of clamping elements (40) for clamping a component (3, 3').

The additional or central component mount (36, 37) may be fixed when needed on the machine bed (12), especially on the guide (32) by means of a controllable fixing device (46) by clamping or in another manner. The fixing device (46) has, e.g., an elastically prestressed clamping against the guide, which can be released hydraulically.

Two such central component mounts (36, 37) are arranged in the double-head machine shown in FIGS. 1 through 5 between the end-side machine heads (13, 14) and they together receive a central and hence third component (3). A respective additional or central component mount (36, 37), which receives an individual additional component (3, 3'), is associated with each machine head (13, 14) in the double single-head machine shown in FIG. 10. A machine head (13) and an additional component mount (36) are present in the machine, not shown, said latter component mount (36) receiving an additional component (3).

The component mounts (34, 35, 36, 37) may receive the respective component (2, 3, 3', 4) in any desired and suitable manner. They preferably have for this each a remotely controllable clamping device (39) with adjustable clamping elements (40) and an actuating device (41). The clamping device (39) may be configured as a chuck, optionally with a one-step or multistep configuration, or as a self-centering chuck or in another manner.

Figure 11:
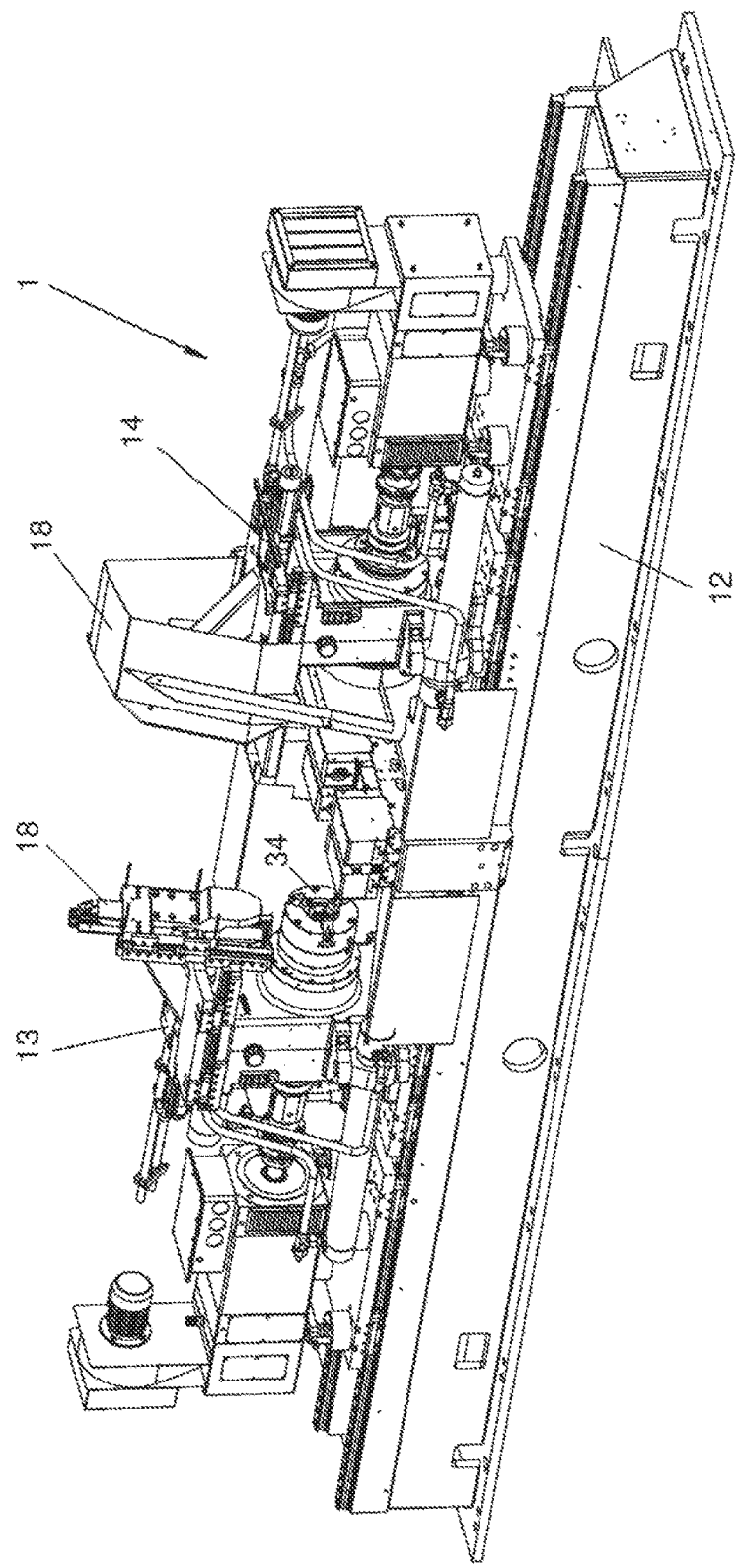
FIG. 11 is a perspective side view showing a pressure welding device with an unjacketed machining device.
Figure 12:
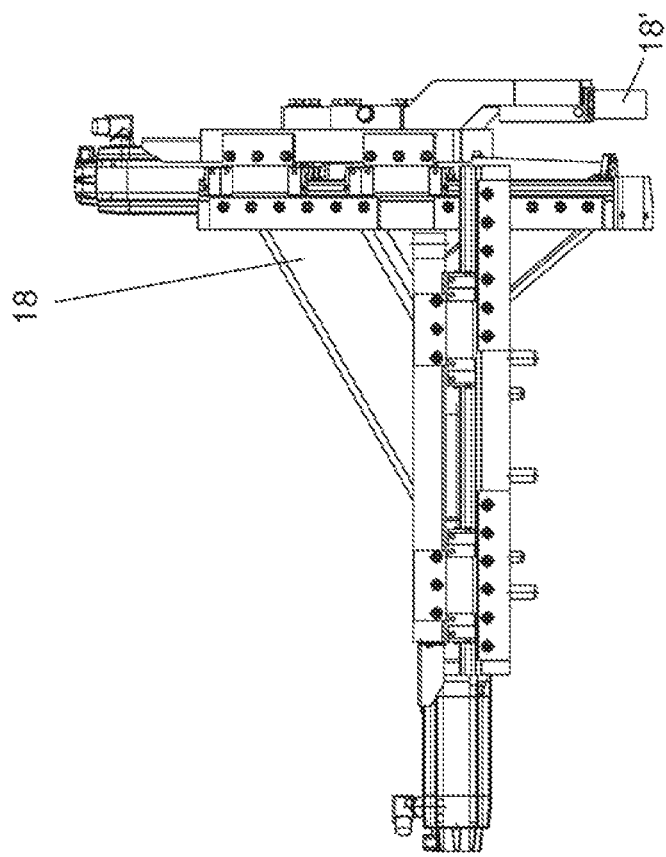
FIG. 12 is a perspective view of the machining device from FIG. 11.
Figure 13:
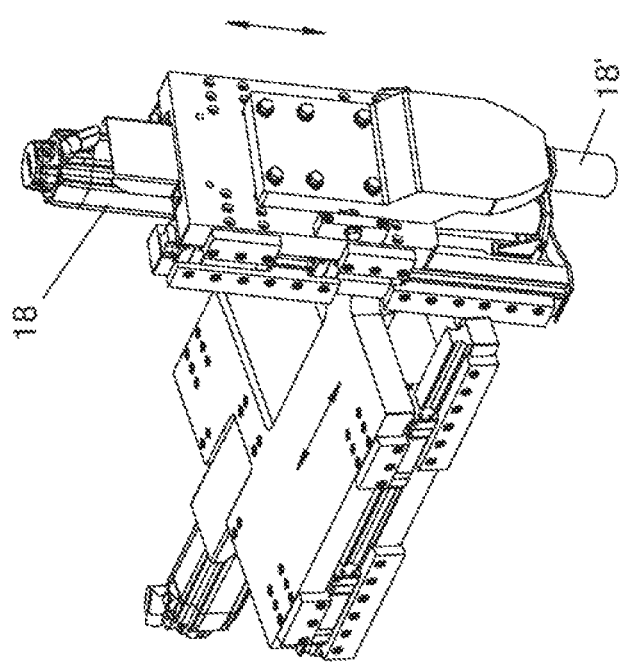
FIG. 13 is a side view of the machining device from FIG. 11.

The pressure welding device (1) has a machining device (18) associated with the machine head (13, 14) and/or with the additional component mount (36, 37) for machining the welded part (5, 5') after the welding process. The machining device (18) may optionally also be used for machining one or more yet to be connected components (2, 3, 3', 4). Such a machining device (18) is shown as an example in FIGS. 1 through 5 as well as in FIGS. 11 through 14. A jacketed machining device (18) is shown in FIGS. 1 through 5. FIGS. 11 through 13 show an exemplary embodiment with the jacket removed.

The pressure welding device (1) further has an adjusting device (17), with which a relative motion is generated between the machine head (13, 14) and the associated additional component mount (36, 37). This relative motion and the change in the distance between the machine head (13, 14) and the component mount (36, 37), which change is associated herewith, can be used for the machining of the welded part (5, 5') or possibly a component (2, 3, 3', 4). A plurality of adjusting devices (17) may be present.

In the first variant of the pressure welding device (1) from FIGS. 1 through 5 as well as FIGS. 11 through 13, the machining device (18) is arranged at the machine head (13, 14), and the adjusting device (17) increases the distance between the machine head (13, 14) and the component mount (36, 37) with the relative motion. A free space is now formed for the machining device (18). The adjusting device (17) preferably moves the component mount (36, 37) relative to the respective machine head (13, 14).

The component mount (36, 37) is opened during the relative motion, and the welded part (5) is held on the end side at the component mounts (34, 35) of the machine heads (13, 14). The distance is selected to be such that the machining device (18) has sufficient space for the feeding at the welded part (5) and for performing process motions there. The machining takes place, e.g., at the weld joint and at the ring-shaped weld bead (5") located there, which is removed during the machining. The welded joint is usually located relatively close to the machine head-side component mount (34, 35) and becomes readily accessible through the distancing mentioned. The machining device (18) may have one or more driven feed axes for the machining tool (18').

FIGS. 11 through 13 illustrate as an example a configuration of the machining device (18), which is permanently or detachably mounted in a suitable manner at a machine head (13, 14). The feed axes, which are symbolized by arrows in FIG. 12 and are, e.g., at right angles, are formed by a compound slide with controllable axis drives. The schematically indicated machining tool (18') is arranged, preferably changeably, at the driven slide, which can be fed, e.g., vertically. The machining tool (18') can be fed by the feed axis (axes) to the rotating or stationary welded part (5) for the machining process and it optionally may also perform, e.g., an axial (6) process stroke. The pressure welding device (1) may be configured in the above-described manner. The welded part (5) is not shown in FIG. 11 for clarity's sake.

Figure 14:
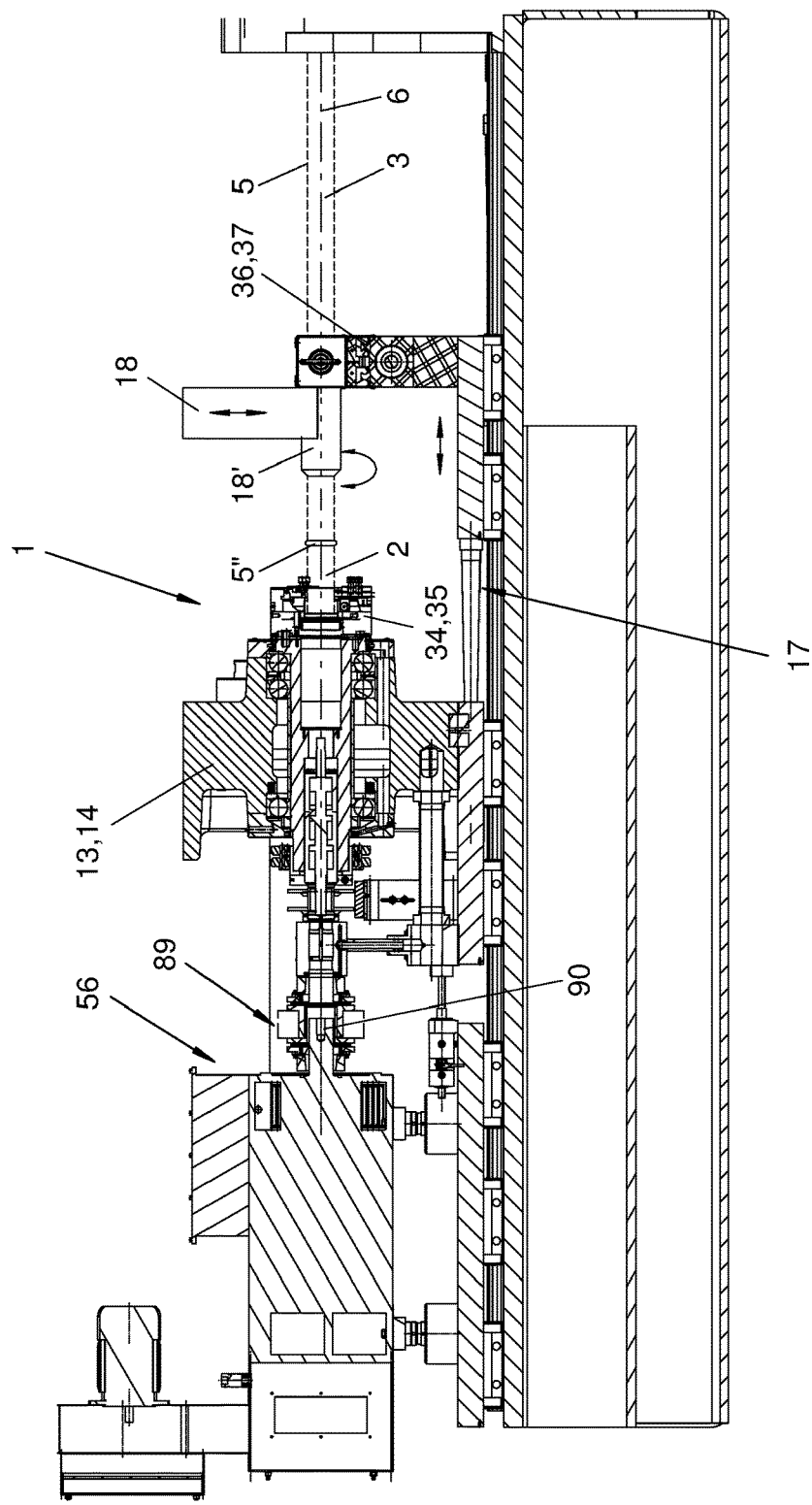
FIG. 14 is a sectional view showing a variant of the pressure welding device and of the machining device.

In another embodiment according to FIG. 14, the machining device (18) may be arranged at the additional or central component mount (36, 37). The adjusting device (17) can now generate a positioning of the machining device (18) at a machining point and/or a working stroke of the device (18) for performing the machining. The additional component mount (36, 37) in question is opened during this relative motion as well.

In the embodiment shown in FIGS. 1 through 5 as well as in FIGS. 11 through 13, the machining device (18) is configured as a cutting device, especially as a turn-off device for the weld bead (5"). The machining tool (18') may be configured here, e.g., as a cutting chisel, which can be fed along one axis or along a plurality of axes and which interacts with the rotating welded part (5), which is rotated by the heads (13, 14) and the spindle drives (56) thereof. As an alternative, the machining tool (18') may be configured as a rotating milling cutter, abrasive material or in another manner. The weld bead is preferably removed by machining, but it may also be carried out, as an alternative, in another manner, e.g., by erosion.

In the second embodiment shown in FIG. 14, the machining device (18) arranged on the additional component mount (36, 37) may be configured, e.g., as a ring-shaped punch, which performs an axial punching and cutting stroke by means of the relative motion in relation to the rotating or stationary welded part (5, 5') and cuts off the weld bead (5") in the process. The machining tool (18') is formed by, e.g., punching trays or punching knives, which can be folded or fed, with front-side cutting edge. The machining device (18) may have one or more feed axis (axes) in this variant as well.

In a further variation, the machining device (18) may have a double tool, which acts on the weld bead (5") on both sides in the axial direction and removes same. Positioning at the processing or machining point on the welded part (5, 5') or optionally also at a component (2, 3, 3', 4) can be carried out now by means of the relative motion of the additional component mount (36, 37).

The machining device (18) and the adjusting device (17) may be arranged and configured in the above-described manner and used to machine the welded parts (5), of which there are two here, or the components (2, 3, 3', 4) in the case of the double single-head machine according to FIG. 10. A component support (not shown here), which is configured, e.g., as a steady rest with rollers and supports the rotating welded part (5'), may be arranged on the component mount (36, 37), especially on the support (42) thereof. A corresponding arrangement, which is an individual arrangement of the machine head (13) and an additional component mount, also applies to the single-head machine, not shown.

The adjusting device (17) may have various configurations and arrangements. In the variants according to FIGS. 1 and 10, two adjusting devices (17) are present, and an adjusting device (17) each is associated with the central component mounts (36, 37). The simple single-head machine has only one adjusting device (17). Such a configuration with machining on one side is also possible in FIGS. 1 and 10.

The adjusting device (17) can act in different manners. On the one hand, it may bring about the above-described relative motion and change in distance for the machining. On the other hand, it may be used to set the length for different components (2, 3, 3', 4) with different component lengths. It can bring about a compensation of insertion errors, component tolerances or even component elasticities in the welding process.

The adjusting device (17) has a controllable coupling device (48, 49), whose length can be varied. A plurality of these adjusting devices may also be present.

In the variants shown in FIGS. 1 and 10, a coupling device (48) is located between the central component mount (36, 37) and the upsetting or support head (27). It brings about the relative motion and the change in distance for the machining. It drives the component mount (36, 37) and moves it relative to the upsetting or support head (27), at which it is, on the other hand, supported in such a way that it is secured on the frame.

Further, the coupling device (48) is arranged between the machine head (13, 14) and the associated additional component mount (36, 37). It drives and moves the component mount (36, 37), and it is supported at the support head (13, 14). This coupling device (48) is used to compensate insertion errors, component tolerances or even component elasticities during the welding process.

The coupling devices (48, 49) may have an identical configuration. They ensure a connection of the components (13, 14, 27, 36, 37) in the direction of the machine axis (6) and are preferably connected to the respective carriers (15, 16, 42, 43) thereof.

The coupling devices (48, 49) have each a coupling element (50). This is configured, e.g., as a coupling rod, which is arranged as a single coupling rod or as a plurality of coupling rods and preferably extends along the machine axis (6). The coupling devices (48, 49) further have a locking device (51) and a coupling adjuster (52) each, which interact with the coupling element (50).

The coupling element (50) is arranged in the coupling device (48) between the machine head (13, 14) and the associated additional component mount (36, 37) and is adjustably connected to both. The locking device (51) is arranged at the machine head (13, 14), preferably at the carrier (15, 16) thereof. The coupling adjuster (52) is located at the component mount (36, 37), preferably at the carrier (42, 43) thereof. The association may also be reversed.

The coupling element (50) of the coupling devices (49) is arranged between the component mount (36, 37) and the upsetting head (27) and is likewise connected adjustably to both. The locking device (51) is arranged at the component mount (36, 37), preferably at the carriers (42, 43) thereof, and the coupling adjuster (52) is arranged at the support or upsetting head (27). The association may likewise be reversed here.

The coupling element (50), especially the coupling rod, is received at an end area at the locking device (51) longitudinally movably and with a controllable clamping. The locking device (51) may be configured, e.g., as a controllable rod clamping. With the clamping opened, the coupling element (50) can axially be displaced relative to the locking device (51).

At the other end area, the coupling element (50) is connected to the coupling adjuster (52). The coupling adjuster (52) has a drive, with which it can adjust the coupling element (50) as needed along the machine axis (6) or block it in the existing position. The coupling adjuster (52) or the drive may, in addition, yield elastically when needed upon the action of external forces, e.g., in the manner of a hydraulic spring, within the framework of the above-mentioned adjustment in case of a corresponding connection, and generate a certain opposing force or damping. The coupling adjuster (52) or the drive is configured, e.g., as a hydraulic block cylinder. The adjustment paths of the coupling adjusters (52) may have different lengths.

To compensate changes in length in case of a change of the components (2, 3, 3', 4), the machine head (13, 14) can be moved together with the respective associated component mount (36, 37) by the upsetting drive (22) relative to the upsetting or support head (27) and caused to come close to the desired dimension. The fixing device (46) and the locking device (51) of the coupling device (48) are released now. The coupling device (49) between the machine head (13, 14) and the corresponding component mount (36, 37) is blocked. The longitudinal adjustment may take place without or with the workpiece (3, 3') inserted. The desired position of the machine head (13, 14) and of the corresponding component mount (36, 37) can be detected by a contact between the component and the upsetting stop (28) or by path measurement. A detection device for path and/or position detection may likewise be arranged at the machine head (13, 14).

The locking device (51) is then closed again, so that the coupling element (50) of the coupling device (48) now has the adjusted effective length and the desired distance is set between the component mount (36, 37) and the upsetting or support head (27) for the welding process. The coupling adjuster (52) blocks in this setting.

The components (2, 3, 3', 4) are inserted into the component mounts (34, 35, 36, 37) according to FIG. 6 for the welding process. Any insertion errors or longitudinal tolerances of components can now be compensated by mutually bringing the inserted components (2, 3, 3', 4) closer together. The coupling adjuster (52) of the coupling device (49) is actuated for this and it shortens the distance between the machine head (13, 14) and the associated component mount (36, 37), and the components (2, 3, 3', 4) received here are brought into contact with one another. The fixing device (46) may remain open for this. FIG. 7 shows this operating position.

The fixing device (46) is likewise open during the subsequent welding process and especially during the upsetting. The associated component mount (36, 37) is carried along via the coupling device (48) and due to the contact of the component during a feed of the machine head (13, 14) by means of the upsetting drive (22). Should axial elasticities, especially shortenings of the component (3, 3') occur during the welding process, especially during upsetting, this can be compensated by the elastically yielding coupling adjuster (52) of the coupling device (48). On the other hand, the coupling adjuster (52) of the coupling device (49) yields as well and permits the component mount (36, 37) to come close to the upsetting or support head (27) during the axial feed in the welding process. The component mount (36, 37) is held floatingly as a result during the welding process.

FIGS. 6 through 9 illustrate this above-mentioned sequence of the process steps and motions, FIGS. 6 and 7 showing the above-mentioned longitudinal adjustment and the friction welding process carried out in this exemplary embodiment.

According to FIG. 8, the respective coupling device (49) is actuated after the end of the welding process in order to space the respective component mount (36, 37) apart from the corresponding machine head (13, 14) and to create the free space for the respective machining device (18) and the machining of the welded part (5). FIGS. 7 and 8 show, in addition, the close arrangement of the weld joint at the respective machine head-side component mount (34, 35).

FIG. 9 shows the machining step with the radial feed of the machining tool (18') to the welded part (5). To cut off, especially to turn off, the weld bead (5"), the cutting tool (18') can then be moved additionally in the axial direction along the machine axis (6). The welded part (5) is subsequently removed and the welding process begins anew with the insertion of the components (2, 3, 3', 4). The machining device (18) is not shown for clarity's sake in the second variant of the pressure welding device (1) in FIG. 10. It has, however, the same arrangement and function as in the above-described first exemplary embodiment.

The upsetting devices (8) act in the exemplary embodiments shown in FIGS. 1 through 5 and 10 between the machine heads (13, 14) and the preferably central upsetting or support head (27). The upsetting device (8) now generates pulling forces in the direction of the machine axis (6). It has an upsetting drive (22), which is arranged between the machine head (13, 14) and the upsetting or support head (27) and is connected to both. The upsetting drive (22) acts by pulling and pulls the component (13, 14, 27) against one another.

The upsetting device (22) may have various configurations. In the exemplary embodiments shown, it has two or more parallel drive units (23, 24), which are aligned along the machine axis (6). The drive units (23, 24) are arranged on different sides of the machine axis (6), especially on both sides and are located diametrically opposed to one another in relation to the machine axis (6). The drive units are preferably configured as cylinders.

As an alternative, the drive units (23, 24) may be configured in another manner, e.g., as electrical rod or spindle drives. The arrangements and embodiments explained below in connection with the cylinders (23, 24) shown correspondingly also apply to other embodiments of drive units.

The cylinders (23, 24) are arranged at different levels above the machine bed (12). The cylinder (23) located adjacent to the operating area or the operating side (20) is arranged in a low position and just barely above the top side of the machine bed (12).

The cylinders (23, 24) are preferably configured as hydraulic cylinders. They have an extensible piston rod (26) and a cylinder housing (25) each. The cylinder housings (25) are preferably mounted and supported at the machine head (13, 14). The free ends of the piston rods (26) are fastened at the upsetting or support head (27). In other drive units, the drive housing (25) and the extensible drive element (26), e.g., a toothed rack or a threaded spindle, may be arranged and connected correspondingly.

A frame- or strap-shaped support head (27), which has a central passage (85) for the central workpiece (3), is used in the double-head machine according to FIGS. 1 through 5. An upsetting head (27), which offers a bilaterally acting upsetting stop (28) for the components (3, 3'), is present in the double single-head machine according to FIG. 10. This upsetting stop may be arranged permanently or detachably at the upsetting head (27). It may, e.g., also be able to be mounted, if needed, in the passage (85), so that the pressure welding device (1) can optionally be operated with multiple functions as a double-head machine or as a double single-head machine.

In the exemplary embodiments shown, the friction device (9) has at the machine head (13, 14) a rotatable shaft (54) each, which will hereinafter be called spindle, a component mount (34, 35) arranged on the front side at the spindle (54), a headstock and a spindle drive (56). The headstock (53) contains the mount, guide and support of the spindle (54) and is arranged and supported at the machine head (13, 14). A drive train (57), which extends along the machine axis (6) and is preferably aligned with same, is located between the component mount (34, 35) and the spindle drive (56).

Such an arrangement may also be present in the variant of the plasticization device (7) with an arc device.

The spindle drive (56) is configured as a direct drive in the embodiment being shown. It has a drive motor (58), whose motor shaft (59) is aligned essentially flush with the longitudinal axis of the spindle (54) and with the machine axis (6). The motor shaft (59) is coupled via a coupling (62) with the spindle (54) or with an actuating device (41) for the component mount (34), which actuating device will be explained below. The coupling (62) has a nonrotating and flexurally elastic configuration. It can compensate possible alignment errors, especially lateral offset and/or oblique position. Further, a controllable brake (not shown) may be present in the drive train (57).

As an alternative, the drive motor may be arranged laterally offset from the spindle (54) as well as from the machine axis (6) and drive the spindle (54) via an intermediate gear, especially a belt drive.

In another variant, the spindle drive (56) may have a disk flywheel arrangement (not shown). The disk flywheels are set into rotation about the machine axis (6) by the drive motor (58) and then bring about an inertia drive for the spindle (54), and a controllable brake can control or regulate the speed of rotation in the drive train (57) and possibly also stop the rotation. The disk flywheel arrangement can be separated from the drive motor (58) and optionally from the spindle (54) by means of a coupling.

Figure 4:
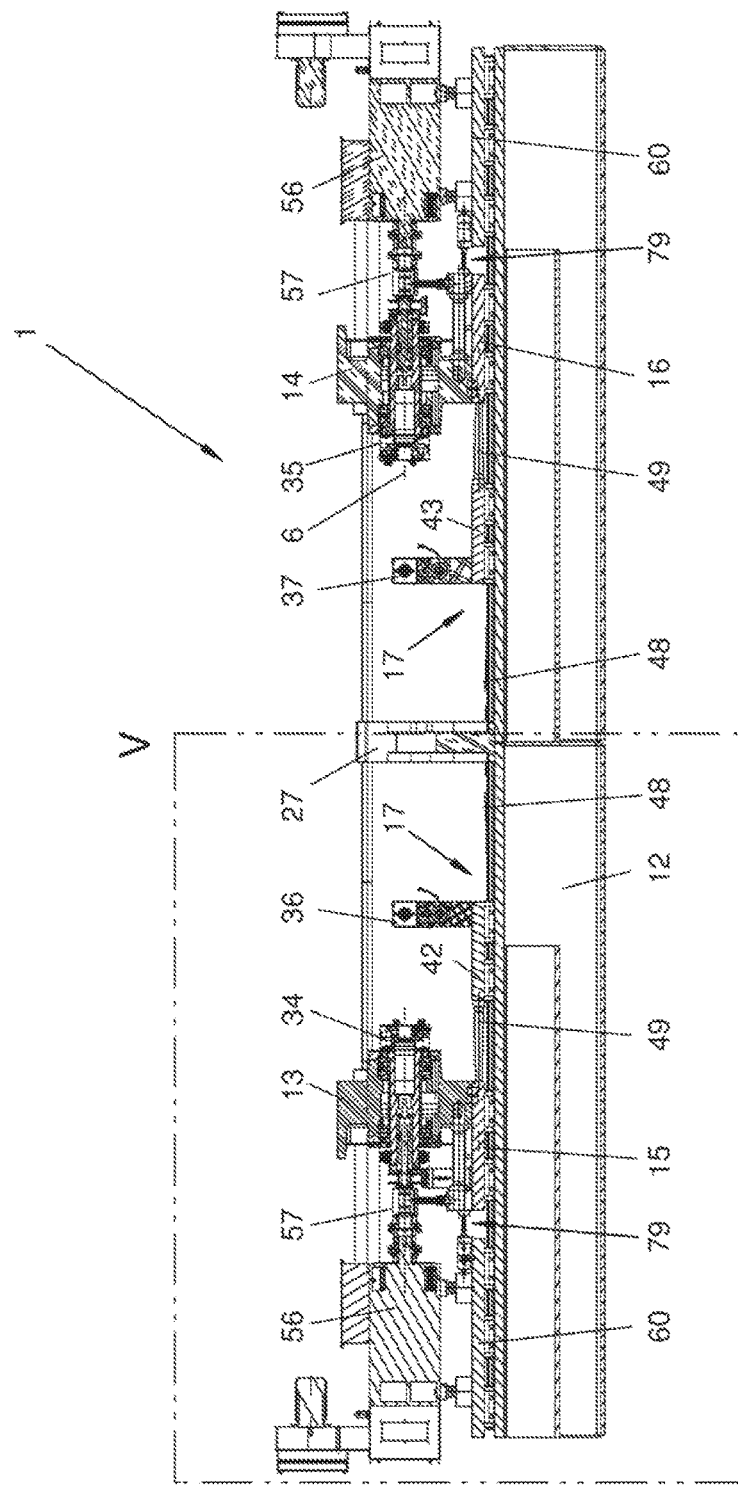
FIG. 4 is a longitudinal sectional view through the pressure welding device according to section line IV-IV in FIG. 3.
Figure 5:
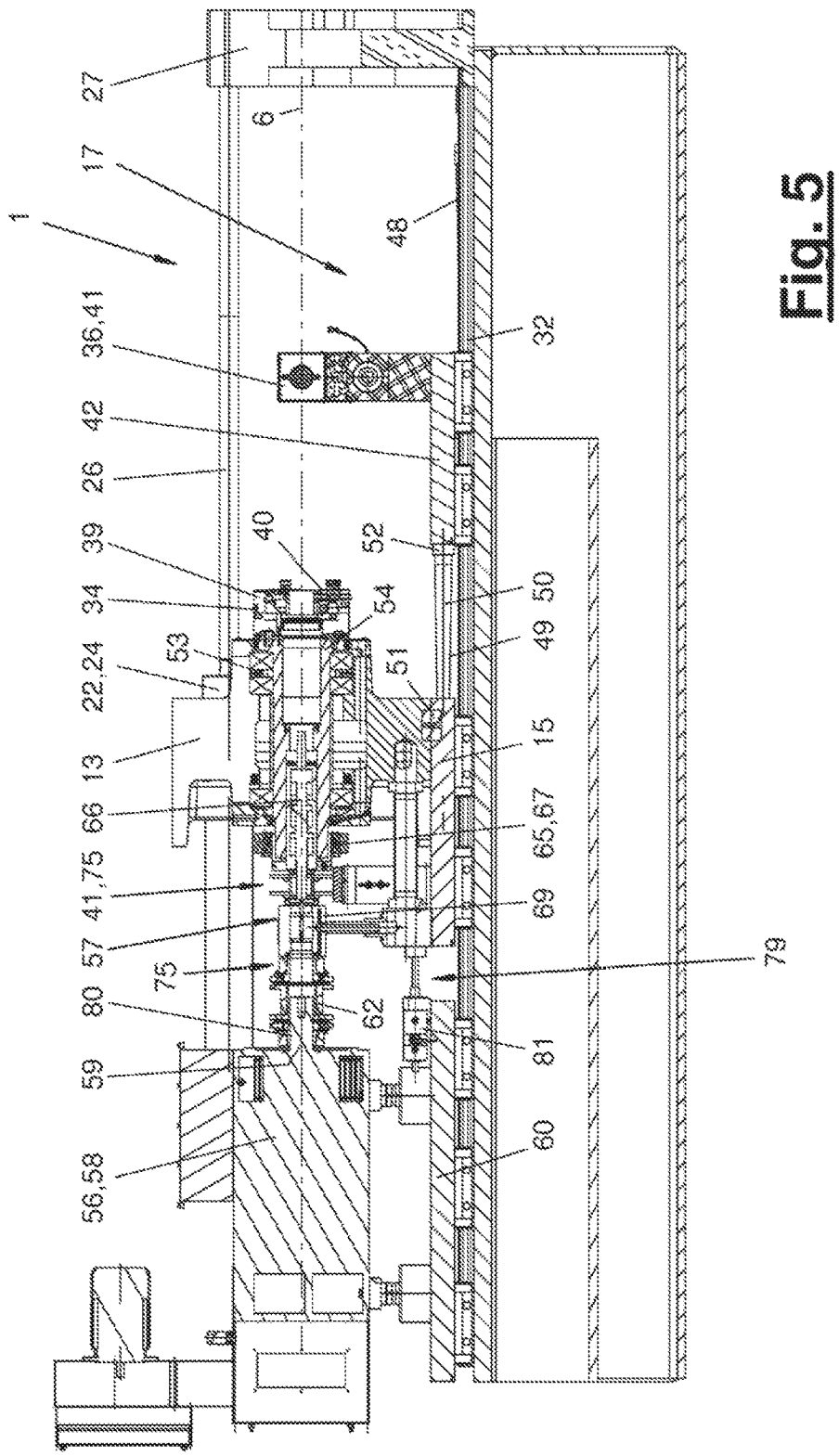
FIG. 5 is an enlarged sectional view of detail V from FIG. 4.

The pressure welding device (1) has said actuating device (41) for the component mount (34) at the machine head (13). It preferably acts on the clamping element or clamping elements (40). The actuating device (41) has an actuating drive (65), which is arranged between the spindle drive (56) and the spindle (54) in the drive train (57). The actuating drive (65) is preferably arranged co-rotating in the drive train (57). FIGS. 4 and 5 illustrate this arrangement. The spindle drive (56), especially the drive motor (58), may again be provided as a direct drive and aligned flush with the machine and spindle axis (6), which leads to advantages in terms of free selection of the motor and the resulting economy.

The actuating device (41) has an actuating drive (65) with an actuating element (66), which is shown in FIG. 5 and is led through the interior space of the hollow spindle (54) and acts, e.g., by an axial motion on the adjusting devices of the clamping elements (40). The actuating drive (65), which is, e.g., a hydraulic or electric drive, has a jacket-shaped drive housing (67), which is nonrotatably connected to the motor shaft (59), on the one hand, and to the jacket of the hollow spindle (54), on the other hand, and transmits the drive torque of the spindle drive (65) in a deformation-free and loss-free manner.

The actuating device (41) further has a rotary feed device (69) for operating materials, e.g., hydraulic fluid or electric current, from the outside to the actuating drive (65) rotating with the spindle (54). External lines as well as a connection head, which may also have a support function for the rotary feed device (69), are provided for this. Internal lines may be laid in the interior space or jacket of the spindle (54) to the drive devices optionally arranged in the spindle (54), e.g., to a piston arrangement.

In case of a hydraulic actuating drive (65), the operating material supply unit (19) has a pump assembly and a valve arrangement for supplying and connecting the hydraulic actuating drive (65) and the driven elements (66) thereof. A power source and a switching device are correspondingly present in case of an electric actuating drive (65).

Further, a measuring device 89 with a measuring shaft 90 may be arranged in the drive train (57) between the spindle drive (56) and the spindle (54) for detecting the drive torque and optionally the drive speed. The measuring device may be connected between the motor shaft (59) and the spindle (54) or the actuating device (51). The drive or motor shaft (59) may have a split configuration, in which case the measuring shaft is inserted between the shaft halves. As an alternative, the drive or motor shaft (59) may be provided with suitable measuring elements and form the measuring shaft.

According to FIGS. 1 through 5 and 10, a mass decoupling device (79), which decouples the machine head (13, 14) mounted movably on the machine frame (12) during its feed during the welding process from the spindle drive (56) in the axial direction (60, may further be provided in the drive train (57). A coupling (80) having axial tolerance, e.g., a sliding sleeve, in the drive train (57) may ensure here that the rotating drive is maintained during the feed of the machine head (13, 14). As an alternative, a mutual spacing may also take place while the drive transmission is suspended.

The drive (56) may possibly be arranged here on a slide-like drive carrier (60) and mounted axially displaceably on the machine frame (12) and detachably connected to the head (13, 14), especially to the carrier (15, 16) thereof, via a coupling device (81). The spindle drive (56) may further be locked temporarily on the machine frame (12) by means of a drive fixing device for the mass decoupling.

Various variants of the exemplary embodiments shown and described are possible. In particular, the features of the different exemplary embodiments may be combined with or also replaced by one another as desired. The upsetting drive (22) may be configured in the conventional manner, e.g., according to the state of the art mentioned in the introduction, and generate forces of pressure. The adjusting device (17) may have only one coupling device (48, 49) for said relative motion for the machining or a transposed arrangement of coupling devices (48, 49). An individual coupling device may, in addition, assume all said adjusting functions in case of a corresponding configuration.

While specific embodiments of the invention have been shown and described in detail to illustrate the application of the principles of the invention, it will be understood that the invention may be embodied otherwise without departing from such principles.

The invention claimed is:

1. A pressure welding device with a plasticization device comprising an upsetting device, the pressure welding device further comprising:
   component mounts for the components to be welded together;
   a machine frame;
   a machine head with a component mount;
   an additional component mount, associated with the machine head, wherein the machine head is arranged movably on the machine frame;
   a machining device, for machining the welded part, the machining device being arranged at the machine head;
   an adjusting device for generating a relative motion between the machine head and the associated additional component mount for machining the welded part, wherein the adjusting device increases a distance between the machine head and the component mount with the relative motion and forms a free space for the machining device; and
   a coupling device, wherein the coupling device has a coupling element with a locking device and with a coupling adjuster, wherein the coupling element is received at one end area at the locking device longitudinally movably and with controllable clamping and the coupling element is connected at the other end area to the coupling adjuster, wherein the coupling adjuster has a drive comprising a blocking cylinder that adjusts or blocks the coupling element along a machine axis as needed.

2. A pressure welding device in accordance with claim 1, wherein the additional component mount is arranged movably on the machine frame.

3. A pressure welding device in accordance with claim 1, wherein the machine head and the additional component mount are arranged on the machine frame displaceably along a machine axis.

4. A pressure welding device in accordance with claim 1, wherein the machining device is configured as a cutting device for cutting a weld bead on the welded part and the machining device has one or more driven feed axis/axes for a machining tool.

5. A pressure welding device in accordance with claim 1, wherein the coupling device is arranged between the additional component mount and an upsetting head or support head, which is secured on the frame.

6. A pressure welding device in accordance with claim 1, wherein the additional component mount has a switchable fixing device for temporary fixing against the machine frame.

7. A pressure welding device in accordance with claim 1, wherein the pressure welding device has a plurality of machine heads and a plurality of additional central component mounts arranged between the machine heads.

8. A pressure welding device in accordance with claim 1, wherein the upsetting device comprises an upsetting drive with two or more parallel drive units, which are arranged along a machine axis and arranged on both sides next to the machine axis, said upsetting drive being arranged between the machine head and an upsetting or support head, which is secured on the frame, and said upsetting drive acting by pulling.

9. A pressure welding device in accordance with claim 1, wherein a rotatable spindle and a spindle drive are associated with the machine head and the spindle drive has a drive motor, which is arranged essentially aligned with a machine axis and a spindle axis.

10. A pressure welding device in accordance with claim 1, further comprising a measuring device with a measuring shaft for detecting a drive torque, wherein said measuring device is arranged in a drive train between a spindle drive and a spindle.

11. A pressure welding device in accordance with claim 1, wherein the pressure welding device is configured as a friction welding device, wherein the plasticization device has a friction device.

12. A pressure welding device in accordance with claim 1, wherein the pressure welding device is configured as a welding device with a magnetically moved arc, wherein the plasticization device has an arc device.

13. A method for the pressure welding of components with a pressure welding device, which has a plasticization device as well as component mounts for the components to be welded together and a machine frame, the plasticization device comprising an upsetting device, the method comprising:
   arranging a machine head movably on the machine frame with a component mount;
   providing an additional component mount, associated with the machine head;
   providing the pressure welding device with a machining device associated with the machine head or with the additional component mount for the welded part;
   providing an adjusting device, which generates a relative motion between the machine head and the associated additional component mount for machining the welded part, wherein a distance between the machine head and the additional component mount is increased by the adjusting device and space is created for the machining;
   providing a coupling device, wherein the coupling device has a coupling element with a locking device and with a coupling adjuster, wherein the coupling element is received at one end area at the locking device longitudinally movably and with controllable clamping and the coupling element is connected at the other end area to the coupling adjuster, wherein the coupling adjuster has a drive comprising a blocking cylinder that adjusts or blocks the coupling element along a machine axis as needed.

14. A method in accordance with claim 13, wherein a welded part is finished with the machining device in the mounted or clamped position.

15. A method in accordance with claim 13, wherein one or more components yet to be connected are machined with the machining device.

16. A method in accordance with claim 13, wherein the machining device carries out a cutting process comprising a turn-off or punching process for a weld bead.

17. A method in accordance with claim 13, wherein the components to be welded together are plasticized at front edges facing each other by a rotatingly moved arc.

\* \* \* \* \*